US008788260B2

(12) United States Patent
Nygaard et al.

(10) Patent No.: US 8,788,260 B2
(45) Date of Patent: Jul. 22, 2014

(54) GENERATING SNIPPETS BASED ON CONTENT FEATURES

(75) Inventors: Valerie Rose Nygaard, San Francisco, CA (US); Riccardo Turchetto, San Francisco, CA (US); Joanna Mun Yee Chan, Redwood City, CA (US); Christian Biemann, San Francisco, CA (US); David Dongjah Ahn, San Francisco, CA (US); Andrea Ryerson Burbank, San Francisco, CA (US); Feng Pan, Foster City, CA (US); Timothy McDonnell Converse, San Francisco, CA (US); James Michael Reinhold, Berkeley, CA (US); Tracy Holloway King, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 12/777,323

(22) Filed: May 11, 2010

(65) Prior Publication Data

US 2011/0282651 A1     Nov. 17, 2011

(51) Int. Cl.
*G06F 17/27* (2006.01)

(52) U.S. Cl.
USPC ............... 704/9; 704/1; 704/2; 704/3; 704/4; 704/5; 704/6; 704/7; 704/8; 704/10; 707/736; 707/738; 707/708; 707/748; 715/205; 715/210; 715/254; 715/256; 715/234; 375/240.25

(58) Field of Classification Search
CPC . G06F 17/2785; G06F 17/274; G06F 17/271; G06F 17/277; G06F 17/2755

USPC ........................................................ 704/1–10
See application file for complete search history.

(56) References Cited

U.S. PATENT DOCUMENTS

| | | | | |
|---|---|---|---|---|
| 4,864,502 A | * | 9/1989 | Kucera et al. | 704/8 |
| 4,887,212 A | * | 12/1989 | Zamora et al. | 704/8 |
| 5,146,405 A | * | 9/1992 | Church | 704/9 |
| 5,479,563 A | * | 12/1995 | Yamaguchi | 704/232 |
| 5,774,833 A | * | 6/1998 | Newman | 704/9 |
| 5,913,185 A | * | 6/1999 | Martino et al. | 704/8 |
| 5,924,108 A | * | 7/1999 | Fein et al. | 715/267 |

(Continued)

OTHER PUBLICATIONS

Nikos Zotos et al., "To Click or not to Click? The Role of Contextualized and User-Centric Web Snippets," SIGIR 2007 Workshop on Focused Retrieval, Jul. 27, 2007, Amsterdam, The Netherlands, 8 pp.

(Continued)

*Primary Examiner* — Pierre-Louis Desir
*Assistant Examiner* — Fariba Sirjani
(74) *Attorney, Agent, or Firm* — Dave Ream; Doug Barker; Micky Minhas

(57) ABSTRACT

Systems, methods, and computer storage media having computer-executable instructions embodied thereon that facilitate generation of snippets. In embodiments, text features within a keyword-sentence window are identified. The text features are utilized to determine break features that indicate favorability of breaking at a particular location of the keyword-sentence window. The break features are used to recognize features of partial snippets such that a snippet score to indicate the strength of the partial snippet can be calculated. Snippet scores associated with partial snippets are compared to select an optimal snippet, that is, the snippet having the highest snippet score.

14 Claims, 5 Drawing Sheets

(56) References Cited

U.S. PATENT DOCUMENTS

| | | | |
|---|---|---|---|
| 5,946,648 A * | 8/1999 | Halstead et al. | 704/9 |
| 5,963,940 A * | 10/1999 | Liddy et al. | 1/1 |
| 5,978,820 A * | 11/1999 | Mase et al. | 715/210 |
| 6,026,388 A * | 2/2000 | Liddy et al. | 1/1 |
| 6,061,675 A * | 5/2000 | Wical | 706/45 |
| 6,181,909 B1 * | 1/2001 | Burstein et al. | 434/353 |
| 6,199,034 B1 * | 3/2001 | Wical | 704/9 |
| 6,285,999 B1 * | 9/2001 | Page | 1/1 |
| 6,289,304 B1 * | 9/2001 | Grefenstette | 704/9 |
| 6,470,306 B1 | 10/2002 | Pringle | |
| 6,473,730 B1 * | 10/2002 | McKeown et al. | 704/9 |
| 6,537,325 B1 * | 3/2003 | Nishizawa | 715/267 |
| 6,658,377 B1 * | 12/2003 | Anward et al. | 704/9 |
| 6,714,905 B1 * | 3/2004 | Chang et al. | 704/9 |
| 6,721,728 B2 * | 4/2004 | McGreevy | 1/1 |
| 6,810,375 B1 * | 10/2004 | Ejerhed | 704/9 |
| 7,017,114 B2 * | 3/2006 | Guo et al. | 715/247 |
| 7,027,974 B1 * | 4/2006 | Busch et al. | 704/4 |
| 7,068,723 B2 * | 6/2006 | Foote et al. | 375/240.25 |
| 7,092,872 B2 * | 8/2006 | Polanyi et al. | 704/9 |
| 7,210,100 B2 * | 4/2007 | Berger et al. | 715/229 |
| 7,233,891 B2 * | 6/2007 | Bond et al. | 704/9 |
| 7,251,781 B2 * | 7/2007 | Batchilo et al. | 715/210 |
| 7,302,646 B2 * | 11/2007 | Nomiyama et al. | 715/764 |
| 7,376,551 B2 * | 5/2008 | Powell et al. | 704/4 |
| 7,398,196 B1 * | 7/2008 | Liu et al. | 704/1 |
| 7,406,458 B1 * | 7/2008 | Carson et al. | 1/1 |
| 7,412,385 B2 * | 8/2008 | Brockett et al. | 704/245 |
| 7,430,504 B2 * | 9/2008 | Vanderwende et al. | 704/9 |
| 7,447,626 B2 * | 11/2008 | Chaney et al. | 704/9 |
| 7,451,395 B2 * | 11/2008 | Brants et al. | 715/254 |
| 7,451,398 B1 * | 11/2008 | Rohrs | 715/271 |
| 7,461,064 B2 * | 12/2008 | Fontoura et al. | 1/1 |
| 7,526,425 B2 * | 4/2009 | Marchisio et al. | 704/9 |
| 7,555,428 B1 * | 6/2009 | Franz et al. | 704/10 |
| 7,587,309 B1 * | 9/2009 | Rohrs et al. | 704/10 |
| 7,624,007 B2 * | 11/2009 | Bennett | 704/9 |
| 7,624,093 B2 * | 11/2009 | Fortuna, Jr. | 1/1 |
| 7,660,813 B2 * | 2/2010 | Milic-Frayling et al. | 707/999.102 |
| 7,689,536 B1 * | 3/2010 | Weissman et al. | 707/999.002 |
| 7,693,829 B1 * | 4/2010 | Alshawi | 707/999.003 |
| 7,698,339 B2 * | 4/2010 | Zhang et al. | 707/755 |
| 7,702,680 B2 * | 4/2010 | Yih et al. | 707/738 |
| 7,747,429 B2 * | 6/2010 | Cho et al. | 704/9 |
| 7,774,198 B2 * | 8/2010 | Roulland et al. | 704/9 |
| 7,783,633 B2 * | 8/2010 | Florian et al. | 707/729 |
| 7,788,262 B1 * | 8/2010 | Shirwadkar | 707/737 |
| 7,831,597 B2 * | 11/2010 | Wu et al. | 707/736 |
| 7,836,391 B2 * | 11/2010 | Tong | 715/234 |
| 7,853,587 B2 * | 12/2010 | Groeneveld et al. | 707/723 |
| 7,930,302 B2 * | 4/2011 | Bandaru et al. | 707/737 |
| 7,930,354 B2 * | 4/2011 | Vuong et al. | 709/206 |
| 7,953,752 B2 * | 5/2011 | Soules et al. | 707/771 |
| 8,032,519 B2 * | 10/2011 | Groeneveld et al. | 707/713 |
| 8,041,601 B2 * | 10/2011 | Fikes et al. | 705/14.54 |
| 8,046,348 B1 * | 10/2011 | Rehling et al. | 707/708 |
| 8,108,398 B2 * | 1/2012 | Guday et al. | 707/739 |
| 8,150,859 B2 * | 4/2012 | Vadlamani et al. | 707/748 |
| 8,161,073 B2 * | 4/2012 | Connor | 707/791 |
| 8,214,347 B2 * | 7/2012 | Matson | 707/706 |
| 8,239,358 B1 * | 8/2012 | Soubbotin | 707/706 |
| 8,255,413 B2 * | 8/2012 | Bennett et al. | 707/766 |
| 8,271,453 B1 * | 9/2012 | Pasca et al. | 707/673 |
| 8,280,885 B2 * | 10/2012 | Cardie et al. | 707/737 |
| 8,290,975 B2 * | 10/2012 | Gao et al. | 707/767 |
| 8,326,842 B2 * | 12/2012 | Vadlamani et al. | 707/748 |
| 8,356,025 B2 * | 1/2013 | Cai et al. | 707/708 |
| 8,380,492 B2 * | 2/2013 | Xu et al. | 704/9 |
| 8,386,262 B2 * | 2/2013 | Bangalore et al. | 704/270.1 |
| 8,434,001 B2 * | 4/2013 | Kandekar et al. | 715/234 |
| 8,650,483 B2 * | 2/2014 | Liu et al. | 715/254 |
| 8,656,264 B2 * | 2/2014 | Newman et al. | 715/205 |
| 2002/0046018 A1 * | 4/2002 | Marcu et al. | 704/9 |
| 2002/0078091 A1 * | 6/2002 | Vu et al. | 707/513 |
| 2002/0099536 A1 * | 7/2002 | Bordner et al. | 704/10 |
| 2002/0128821 A1 * | 9/2002 | Ehsani et al. | 704/10 |
| 2003/0061200 A1 * | 3/2003 | Hubert et al. | 707/3 |
| 2003/0187642 A1 * | 10/2003 | Ponceleon et al. | 704/252 |
| 2004/0044952 A1 * | 3/2004 | Jiang et al. | 715/500 |
| 2004/0230415 A1 * | 11/2004 | Riezler et al. | 704/5 |
| 2005/0138556 A1 * | 6/2005 | Brun et al. | 715/536 |
| 2005/0234953 A1 | 10/2005 | Zhang | |
| 2005/0278314 A1 * | 12/2005 | Buchheit | 707/3 |
| 2006/0026152 A1 * | 2/2006 | Zeng et al. | 707/5 |
| 2006/0161542 A1 * | 7/2006 | Cucerzan et al. | 707/5 |
| 2006/0200464 A1 * | 9/2006 | Gideoni et al. | 707/6 |
| 2006/0200765 A1 * | 9/2006 | Fein et al. | 715/530 |
| 2006/0206806 A1 * | 9/2006 | Han et al. | 715/513 |
| 2006/0224582 A1 * | 10/2006 | Hogue | 707/6 |
| 2006/0277029 A1 * | 12/2006 | Green et al. | 704/4 |
| 2007/0106499 A1 * | 5/2007 | Dahlgren et al. | 704/10 |
| 2007/0179776 A1 * | 8/2007 | Segond et al. | 704/9 |
| 2007/0203863 A1 * | 8/2007 | Gupta et al. | 706/20 |
| 2008/0091408 A1 * | 4/2008 | Roulland et al. | 704/9 |
| 2008/0235209 A1 | 9/2008 | Rathod | |
| 2008/0243479 A1 * | 10/2008 | Cafarella et al. | 704/9 |
| 2008/0270119 A1 * | 10/2008 | Suzuki | 704/9 |
| 2008/0282153 A1 * | 11/2008 | Kindeberg et al. | 715/256 |
| 2008/0300872 A1 * | 12/2008 | Basu et al. | 704/235 |
| 2009/0083026 A1 * | 3/2009 | Morsy et al. | 704/9 |
| 2009/0119275 A1 * | 5/2009 | Chen et al. | 707/5 |
| 2009/0144609 A1 | 6/2009 | Liang | |
| 2009/0182547 A1 * | 7/2009 | Niu et al. | 704/2 |
| 2009/0204609 A1 | 8/2009 | Labrou | |
| 2009/0216737 A1 * | 8/2009 | Dexter | 707/5 |
| 2009/0265304 A1 | 10/2009 | Ait-Mokhtar | |
| 2009/0271179 A1 * | 10/2009 | Marchisio et al. | 704/9 |
| 2009/0300486 A1 * | 12/2009 | Zhu et al. | 715/254 |
| 2009/0326926 A1 * | 12/2009 | Landau et al. | 704/9 |
| 2009/0327224 A1 * | 12/2009 | White et al. | 707/3 |
| 2009/0327269 A1 * | 12/2009 | Paparizos et al. | 707/5 |
| 2010/0005092 A1 * | 1/2010 | Matson | 707/5 |
| 2010/0017392 A1 * | 1/2010 | Dian | 707/5 |
| 2010/0031142 A1 * | 2/2010 | Nagatomo | 715/254 |
| 2010/0145940 A1 * | 6/2010 | Chen et al. | 707/736 |
| 2010/0286979 A1 * | 11/2010 | Zangvil et al. | 704/9 |
| 2011/0264670 A1 * | 10/2011 | Banerjee et al. | 707/749 |
| 2011/0270604 A1 * | 11/2011 | Qi et al. | 704/9 |
| 2012/0078612 A1 * | 3/2012 | Kandekar et al. | 704/9 |
| 2012/0123767 A1 * | 5/2012 | Ananthanarayanan et al. | 704/9 |
| 2012/0131021 A1 * | 5/2012 | Blair-Goldensohn et al. | 707/750 |
| 2012/0158400 A1 * | 6/2012 | Schmidt et al. | 704/9 |
| 2013/0024183 A1 * | 1/2013 | Cardie et al. | 704/8 |
| 2013/0144607 A1 * | 6/2013 | Weber | 704/9 |
| 2013/0144870 A1 * | 6/2013 | Gupta et al. | 707/726 |

OTHER PUBLICATIONS

David Azari, et al., "Actions, Answers, and Uncertainty: A Decision-Making Perspective on Web-Based Question Answering," Proceedings of the Conference on Uncertainty and Artificial Intelligence, Aug. 2003, 28 pp.

Vanessa Lopez, et al., "Question Answering on the Real Semantic Web," Nov. 2007, Knowledge Media Institute, The Open University, U.K., 3 pp.

* cited by examiner

GENERATING SNIPPETS BASED ON CONTENT FEATURES

BACKGROUND

In response to user queries, search results are oftentimes presented in the form of captions including a title, a URL, and a snippet. A snippet summarizes or characterizes a corresponding webpage and generally includes query terms input by the user. In this regard, snippets are usually a selection of text from the corresponding webpage that include keywords that match query terms of the user's query. The context that surrounds those keywords, however, is oftentimes truncated to maintain a predetermined snippet length. Such snippet truncations can occur at seemingly arbitrary boundaries resulting in an omission of words deemed valuable by providing context, completeness, and/or coherency. In this regard, arbitrary snippet boundaries can result in reduced readability and understandability thereby making it more difficult for a user to determine the relevance or content of a document associated with a search result. Accordingly, a user may overlook a search result or unnecessarily select a search result to further view contents thereof.

Generating snippets in accordance with optimal or preferred snippet boundaries provides fewer inscrutable snippets containing abrupt truncations of context. Such snippets having optimal snippet boundaries can initially provide users with higher quality information in response to a user query. As such, users can more accurately determine whether to click through to a document corresponding with a search result. By way of example only, assume that essential information a user is seeking, such as a "punch line" or an "answer," is at the end of a sentence having keywords that match query terms. In conventional snippet construction based primarily on length, however, the end of a sentence is oftentimes truncated to accommodate such length restrictions. On the other hand, a snippet boundary that occurs at the end of the sentence provides the essential information the user is seeking.

SUMMARY

Embodiments of the present invention relate to systems, methods, and computer-readable media for, among other things, facilitating generation of snippets based on content features. In this regard, embodiments of the present invention facilitate snippet generation to enhance the snippet content provided to a user. Accordingly, a snippet having snippet boundaries that align with natural breaks in the text and that avoid omitting potentially significant content enable a user to better understand and comprehend content in association with a search result. Embodiments of the invention utilize features that describe or characterize text as well as features that indicate favorability of snippet boundaries to identify and/or select an optimal snippet for presenting in association with a search result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
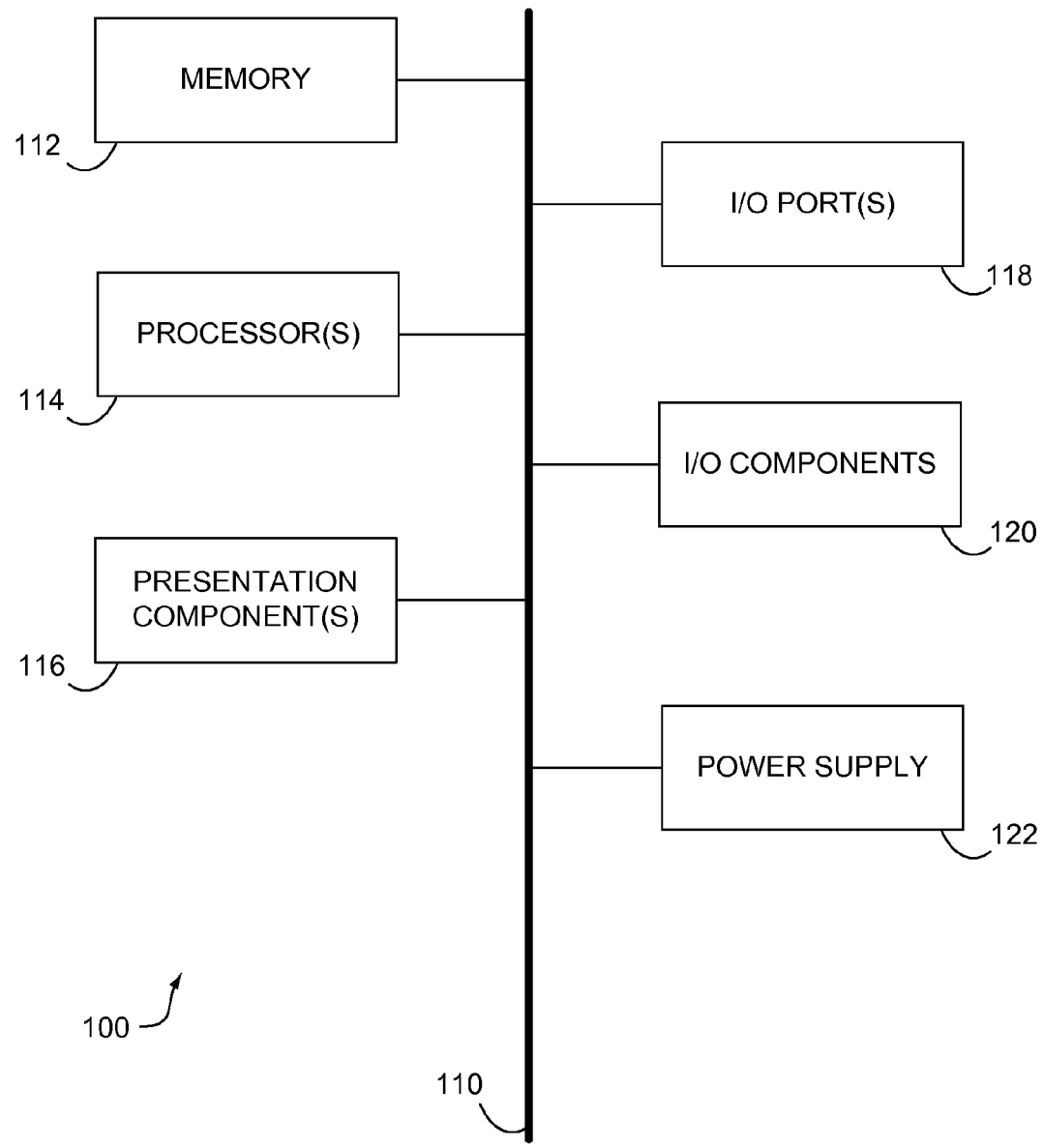
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that facilitate generation of snippets. In this regard, embodiments of the present invention facilitate identifying and selecting an optimal snippet(s) to present or display in association with a search result (e.g., a webpage search result). An optimal snippet, as used herein, refers to a snippet (i.e., a portion) of content intended to provide a user with desirable, appropriate, or significant information. That is, an optimal snippet results in an understandable and a comprehendible snippet. Accordingly, a user viewing snippets in association with search results is provided with higher quality information in response to a query and can thereby more easily and accurately determine whether to click through to a search result.

To provide such an optimal snippet, the snippet conforms with optimal snippet boundaries. A snippet boundary, as used herein, refers to a location at which webpage content (e.g., a keyword-sentence window) is, or is to be, truncated to generate a snippet. An optimal or preferred snippet boundary refers to a snippet boundary that results in a readable, understandable, and comprehendible snippet.

Accordingly, in one aspect, the present invention is directed to one or more computer storage media having computer-executable instructions embodied thereon, that when executed, cause a computing device to perform a method for facilitating generation of snippets provided in association with search results. The method includes referencing a keyword-sentence window comprising a sequence of tokens including keywords that match query terms. The method also includes identifying a part-of-speech for tokens. The method further includes utilizing the part-of-speech corresponding with each of the tokens to identify text features associated with a span including two or more tokens. The text features being used to generate a snippet comprising a portion of the keyword-sentence window truncated at optimal snippet boundaries.

In another aspect, the present invention is directed to a method for facilitating generation of snippets provided in association with search results. The method includes identifying features for spans within a keyword-sentence window. At least a portion of the text features are identified based on a part-of-speech identifier associated with tokens of the span. Break features associated with the spans are determined using the text features. The break features provide an indication of whether a snippet boundary is favorable relative to a particular position within the keyword-sentence window. The break features are utilized to generate a snippet comprising a portion of the keyword-sentence window truncated at appropriate snippet boundaries.

In yet another aspect, the present invention is directed to one or more computer storage media having computer-executable instructions embodied thereon, that when executed, cause a computing device to perform a method for facilitating generation of snippets provided in association with search results. The method includes identifying text features associated with spans within a keyword-sentence window. The keyword-sentence window includes at least one keyword that matches at least one query term. At least a portion of the text features are identified based on a part-of-speech identifier associated with tokens of the span. Break features associated with the spans are determined using the one or more text features. The break features provide an indication of whether a snippet boundary is favorable relative to a particular position within the keyword-sentence window. Partial snippets comprising portions of the keyword-sentence window are generated. Snippet features are identified for each partial snippet, and a score is determined for each of the partial snippets that indicates favorability of truncating the keyword-sentence window at snippet boundaries as indicated in the partial snippet. Based on the scores, a partial snippet is selected to display in association with a search result. The selected partial snippet is designated as having optimal snippet boundaries.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
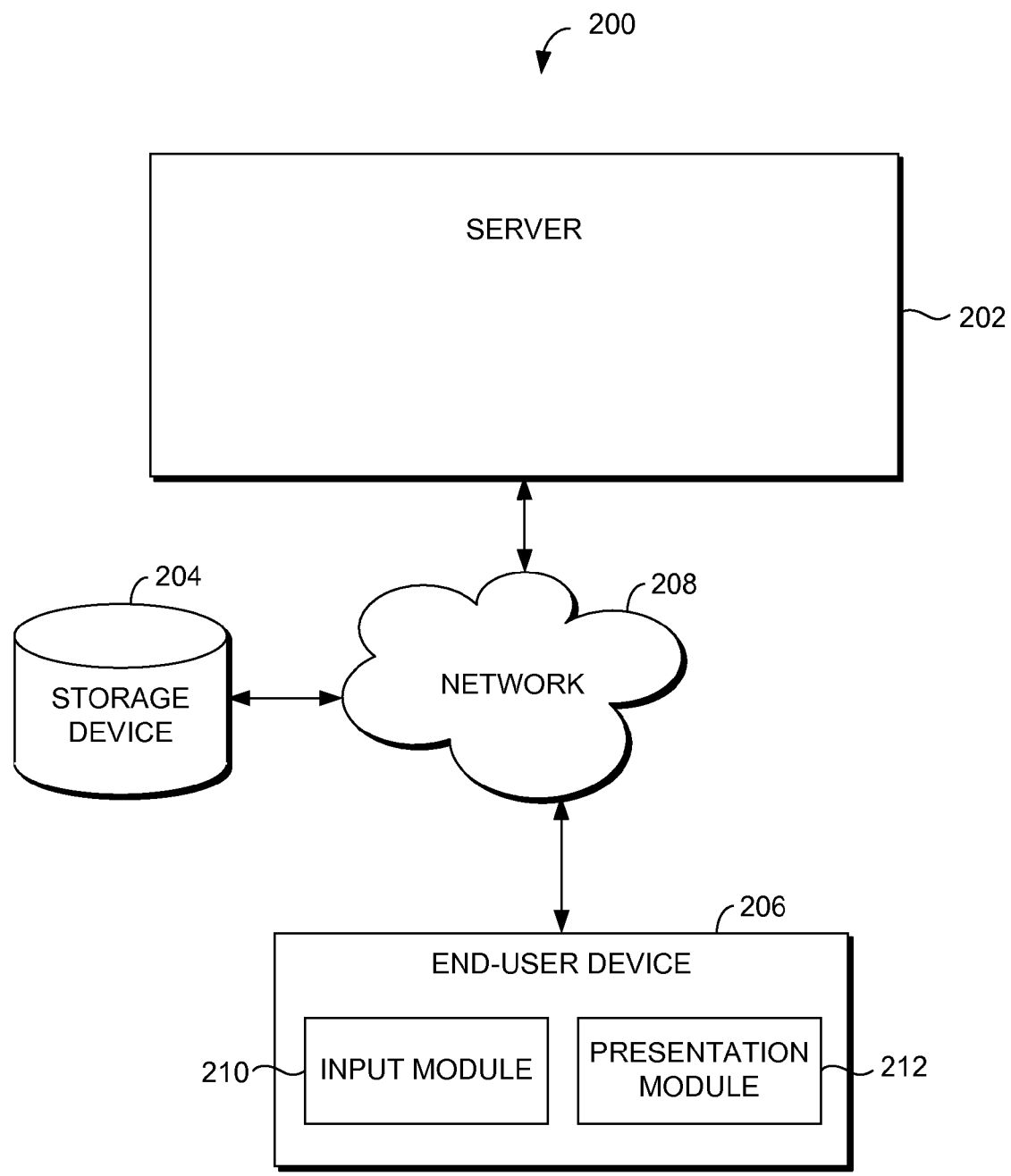
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, and an end-user device 206, all in communication with one another via a network 208. The network 208 may include, without limitation, one or more local area networks (LANs) and/or wide area networks (WANs). Such networking environments are commonplace in offices, enterprise-wide computer networks, intranets and the Internet. Accordingly, the network 208 is not further described herein.

The storage device 204 is configured to store information associated with snippets. In various embodiments, such information may include, without limitation, webpage content, keyword-sentence windows, snippets, partial snippets, tokens, spans, text features, break features, snippet features, and/or the like. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more webpage content, keyword-sentence windows, snippets, partial snippets, tokens, spans, text features, break features, snippet features, and/or the like. The content and volume of such information are not intended to limit the scope of embodiments of the present invention in any way. Further, though illustrated as a single, independent component, the storage device 204 may, in fact, be a plurality of storage devices, for instance a database cluster, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft® Corporation headquartered in Redmond, Wash.

Components of server 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 208. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the server 202 is scalable. For example, the server 202 may in actuality include a plurality of servers in communication with one another. Moreover, the storage device 204 may be included within the server 202 or end-user device 206 as a computer-storage medium. The single unit depictions are meant for clarity, not to limit the scope of embodiments in any form.

As shown in FIG. 2, the end-user device 206 includes a user input module 210 and a presentation module 212. In some embodiments, one or both of the modules 210 and 212 may be implemented as stand-alone applications. In other embodiments, one or both of the modules 210 and 212 may be integrated directly into the operating system of the end-user device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input. Such input might include, for example, user search queries. Typically, input is input via a user interface (not shown) associated with the end-user device 206, or the like. Upon receiving input, the presentation module 212 of the end-user device 206 is configured for presenting snippets, for example, in association with search results. Embodiments are not intended to be limited to visual display but rather may also include audio presentation, combined audio/video presentation, and the like.

Figure 3:
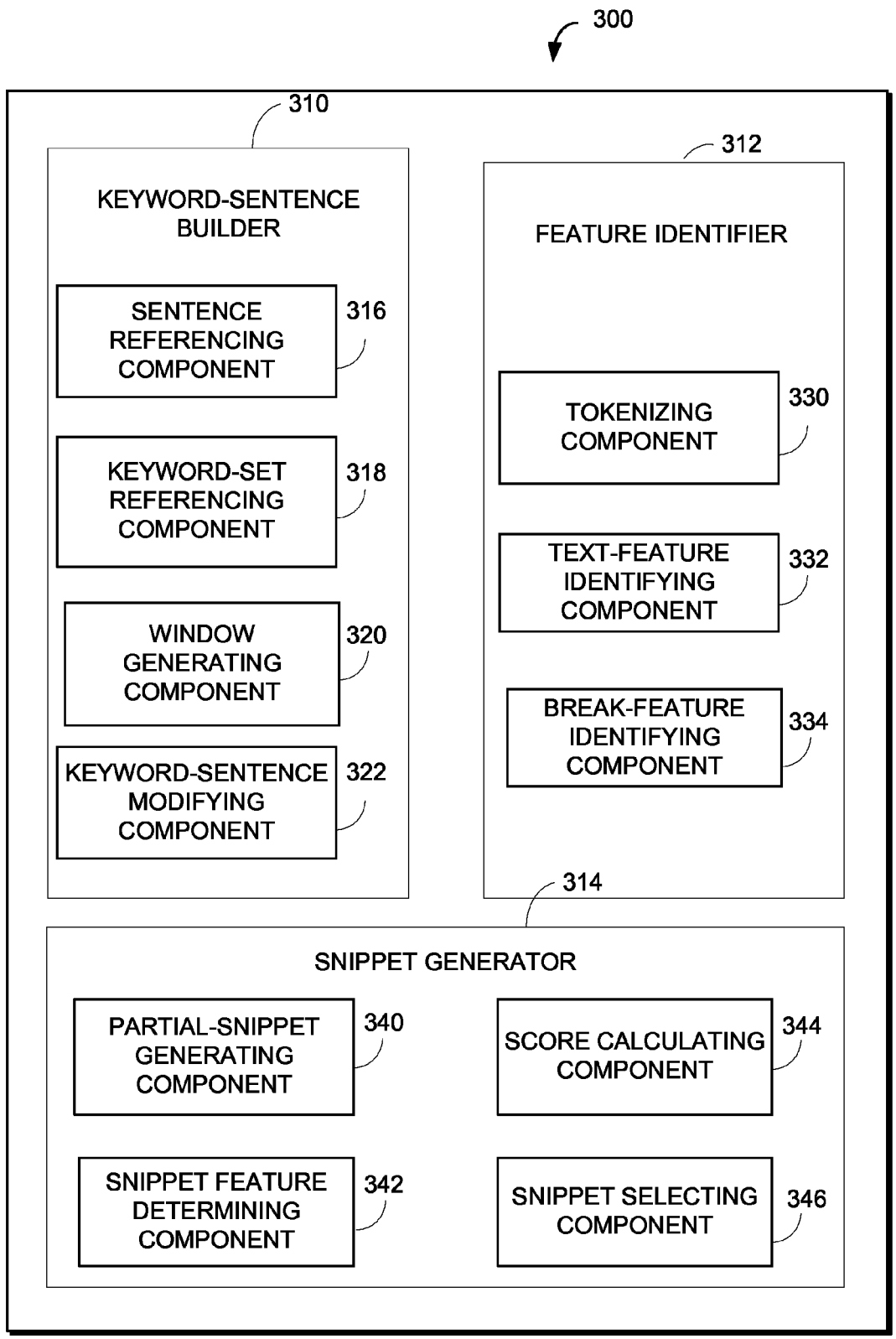
FIG. 3 is a block diagram of an exemplary computer system for use in implementing embodiments of the present invention.

FIG. 3 illustrates an exemplary computing system 300 for facilitating generation of snippets. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out be hardware, firmware, and/or software. For instance, various functions may be carried out by a processor executing instructions stored in memory.

As shown in FIG. 3, the computing system 300 includes, among other components, includes a keyword-sentence builder 310, a feature identifier 312, and a snippet generator 314. In some embodiments, one or more of the illustrated components/modules may be implemented as stand-alone applications. In other embodiments, one or more of the illustrated components/modules may be integrated directly into the operating system of the server 202, a cluster of servers (not shown) and/or the end-user device 206. It will be understood by those of ordinary skill in the art that the components/modules illustrated in FIG. 3 are exemplary in nature and in number and should not be construed as limiting. Any number of components/modules may be employed to achieve the desired functionality within the scope of embodiments hereof. Further, components/modules may be located on any number of servers or computing devices.

The keyword-sentence builder 310 is configured to generate keyword-sentence windows, as described more fully below. A keyword sentence, as used herein, refers to a sentence having one or more keywords that correspond with query terms of a query. In this regard, upon receiving a query having query terms, a document (e.g., a webpage) containing keywords corresponding with or matching the query terms includes one or more keyword sentences. A document can be, for example, a webpage or website relevant to a query. A keyword-sentence window, as used herein, refers to at least one or more keyword sentences, or a portion thereof, including one or more keywords. In this regard, a keyword-sentence window can include document content (e.g., sentences) in addition to a keyword sentence(s) having a keyword(s). For example, a keyword-sentence window might include a couple of sentences before a keyword-sentence and/or a couple of sentences following a keyword sentence. Further, in some embodiments, a keyword-sentence window includes a portion of a keyword sentence and/or a portion of other document content (e.g., sentences). As can be appreciated, a particular keyword sentence, or portion thereof, can be associated with multiple keyword-sentence windows. For instance, one keyword-sentence window might include a keyword sentence and two previous sentences while another keyword-sentence window might include the same keyword sentence and two sentences following the keyword sentence.

In embodiments, the keyword-sentence builder 310 includes a sentence referencing component 316, a keyword-set referencing component 318, a window generating component 320, and keyword-sentence modifying component 322. The sentence referencing component 316 is configured to reference a set of one or more sentences, or portions thereof, of a document. In this regard, one or more sentences, or portions thereof, can be identified, determined, extracted, recognized, accessed, received, retrieved, etc. In one embodiment, sentences are referenced from a sentence breaker, or other component. A sentence breaker, as used herein, identifies sentences by recognizing a beginning point and an ending point of a sentence. A sentence breaker might identify all sentences within a document or a portion of sentences within a document. By way of example only, assume that a particular document is identified as relevant to a query input by a user. In such a case, a sentence breaker might reference the document and identify or specify each sentence within the document. Alternatively, upon referencing a document, a sentence breaker might identify or specify a portion of sentences within a document (e.g., sentences at the top portion of the document, sentences having keywords, sentences surrounding keyword sentences, etc.). A sentence can be designated or specified as such in any manner such as, for example, an indication of a beginning point of each sentence and/or an indication of an ending point of each sentence.

The keyword-set referencing component 318 is configured to reference one or more keyword sets. In this regard, one or more keyword sets can be identified, determined, extracted, recognized, accessed, received, retrieved, etc. A keyword set, as used herein, refers to one or more keywords within a document that correspond or match query terms of a query. In some embodiments, a keyword set might exist for each combination of keywords. Alternatively, a predetermined number or arrangement of keyword sets might exist. That is, a select group of one or more keyword sets might be generated (e.g., via the keyword-set referencing component 318 or other component such as a keyword-set generator) and/or referenced. In such a case, each keyword within a document that matches a query term might be recognized while a portion of such keywords are selected as a keyword set.

By way of example only, assume that a query includes query terms A, B, and C. In such a case, one keyword set might be A1, B1, and C1, in which "1" indicates a particular instance (e.g., first instance) of the keyword within the document. Another keyword set might be A1, B2, C1, in which "1" indicates a particular instance of the keyword and "2" indicates another instance (e.g., a second instance) of the keyword. That is, B1 and B2 are both occurrences of a particular keyword matching a query term, such as "dog," but refer to different instances or locations of the keyword "dog" within the document. As can be appreciated, a keyword set can be a portion of query terms of a query. For example, assume again that a query includes query terms A, B, and C. In such a case, a keyword set might be "A1," while another keyword set might be "B2."

The window generating component 320 is configured to generate keyword-sentence windows. In embodiments, the window generating component 320 utilizes one or more keyword sets, such as keyword sets referenced by the keyword-set referencing component 318, and one or more document sentences, such as sentences referenced by the sentence referencing component 316, to generate keyword-sentence windows. In some cases, the window generating component 320 generates one or more keyword-sentence windows for a keyword set. In this regard, for a particular keyword set, a range of one or more sentences, or portions thereof, surrounding the keywords of the keyword set is identified and designated as a keyword-sentence window for the keyword set. Accordingly, the keyword-sentence window captures each keyword of the keyword set. Additionally or alternatively, the window generating component 320 generates one or more keyword-sentence windows for each keyword of a keyword set. For example, assume that a keyword set comprises three keywords. For each keyword, a range of one or more sentences, or portions thereof, that surround the keyword is identified and designated as a keyword-sentence window for the keyword or keyword set. In other words, the keyword set having three keywords might be associated with three separate keyword-sentence windows. As such, the keyword-sentence window captures a portion of keywords of a keyword set.

The keyword-sentence modifying component 322 is configured to modify keyword-sentence windows, if necessary. In such a case, keyword-sentence windows might be merged together if two or more keyword-sentence windows are adjacent to one another or overlap with one another. In this regard, the keyword-sentence modifying component 322 identifies whether keyword-sentence windows overlap or are sufficiently proximate that a single keyword-sentence window should be utilized. If so, multiple keyword-sentence windows can be aggregated or otherwise modified, for example, by removing or deleting a keyword-sentence window.

By way of example only, assume that a query input by a user is "Wright Incontainables" thereby having two query terms "Wright" and "Incontainables." Further assume that upon receiving the query, a document recognized as relevant to the query includes the following text: "Susan Wright (born 1948) writes science fiction novels, and lives in San Francisco, Calif. She has written two best sellers, 'The Green Glass' and 'Incontainables.'" As such, a keyword set might be [Wright, Incontainables]. In some cases, the position or instance that the keyword appears in the document is identified in association with the keyword set to specify the particular instance of the keyword within the document. Initially, a keyword-sentence window in association with the keyword "Wright" might be or include "Susan Wright (born 1948) writes science fiction novels, and lives in San Francisco, Calif." Similarly, a keyword-sentence window in association with the keyword "Incontainables" might be or include "She has written two best sellers, "The Green Glass" and "Incontainables." Although keyword-sentence windows can include multiple document sentences on either side of each keyword, only one sentence is selected here to simplify the example. Because the two keyword-sentence windows are adjacent to one another within the document, the keyword-sentence modifying component 322 might aggregate the two windows into a single keyword-sentence window.

The feature identifier 312 is configured to identify content features in association with the keyword-sentence windows. Content features, as used herein, refer to features that describe content, such as tokens, spans and breaks therebetween, of a keyword-sentence window. In embodiments, the feature identifier 312 includes a tokenizing component 330, a text-feature indentifying component 332, and a break-feature identifying component 334.

The tokenizing component 330 is configured to generate or identify a set of tokens in association with a keyword-sentence window. A token, as used herein, refers to a distinct portion of a sentence. A token can be, for example, a word, a punctuation mark (e.g., ., ,, :, ", (, ), !, ?, etc.), an acronym, or the like. Accordingly, the tokenizing component 330 references a keyword-sentence window for which a list of tokens is generated or identified. As can be appreciated, one or more keyword-sentence windows can be received, retrieved, identified, determined, recognized, accessed, or the like.

By way of example only, assume that a referenced keyword-sentence window is "Susan Wright (born 1948) writes science fiction novels, and lives in San Francisco, Calif." In such a case, the resulting tokens can include: "Susan", "Wright", "(", "born", "1948", ")", "writes", "science", "fiction", "novels", ",", "and", "lives", "in", "San", "Francisco", ",", "California", ".". Although illustrated as identifying tokens in association with each word, punctuation mark, etc. of the keyword-sentence window, a set of tokens identified for a keyword-sentence window can correspond with a portion of the words and/or punctuation marks of the keyword-sentence window.

The text-feature identifying component 332 is configured to identify text features. A text feature, as used herein, refers to a feature that describes a token or a span of text within a keyword-sentence window. A span refers to a set of two or more consecutive tokens. A text feature may be, without limitation, a token part-of-speech, a bigram type, a named entity, a breakpoint, an address, a phone number, and a predefined name. A token part-of-speech feature refers to an indication of a part-of-speech of a particular token. A part-of-speech includes, for example, a noun, a verb, a conjunction, a preposition, an adjective, an adverb, an interjection, etc. A part-of-speech feature can be identified and/or tagged or annotated by a parts-of-speech tagger (POS tagger). As such, a POS tagger can mark, tag, label, or annotate tokens with parts-of-speech (POS) identifiers. Sample POS identifiers include, but are not limited to, VBN (verb past participle), DT (determinant), NNP (proper noun singular), NN (noun singular or mass), SYM (symbol), CD (cardinal number), CONJ (conjunction), PRP (personal pronoun), etc. Although POS identifiers are generally described using acronyms, POS identifiers can be any identifier capable of identifying a part-of-speech.

By way of example only, assume that a referenced keyword-sentence window is "Susan Wright (born 1948) writes science fiction novels, and lives in San Francisco, Calif." In such a case, the resulting tokens can include: "Susan", "Wright", "(", "born", "1948", ")", "writes", "science", "fiction", "novels", ",", "and", "lives", "in", "San", "Francisco", ",", "California", ".". Accordingly, token part-of-speech features in association with the keyword-sentence window might be: [Susan/NNP, Wright/NNP, (/(, born/VBD, 1948/CD, )/), writes/VBZ, science/NN, fiction/NN, novels/NNS ,/, and/CONJ, lives/VBZ, in/PRP, San/NNP, Francisco/NNP, ,/,, California/NNP, ./.]. As can be appreciated, in some cases, a token POS feature refers to the POS identifier (e.g., NNP, VBZ, etc.). Alternatively, a token POS feature might refer to the combination of the token and the POS identifier associated therewith (e.g., Susan/NNP).

In embodiments, part-of-speech features associated with tokens are used to recognize other text features of tokens, or spans in association therewith. In this regard, a POS identifier that identifies a part-of-speech of a token can be used to identify other text features of the token or a span including the token. For instance, a part-of-speech feature can be used to identify a bigram type feature, a named entity feature, and a breakpoint feature. A bigram type feature refers to an indication of a type of bigram. A bigram, as used herein, is a sequence of two consecutive tokens. A bigram type provides a sequence of two parts-of-speech identifiers that correspond with a sequence of two consecutive tokens (i.e., a bigram).

By way of example only, assume that a sequence of two consecutive tokens is "science" and "fiction." Further assume that "science" is identified as a noun (i.e., NN) and that "fiction" is also identified as a noun (i.e., NN). In such a case, the bigram type is NN_NN. Such a feature can include, for example, the bigram and bigram type (e.g., [science_fiction, Bigram_NN_NN]). Alternatively, a bigram type feature refers to the indication of the bigram type (e.g., NN_NN). In some cases, a bigram type may be identified and/or annotated for each bigram or each bigram containing two words. In other cases, a bigram type might be identified and/or annotated for a portion of bigrams within a keyword-sentence window. For example, only bigrams that match at least one of a predefined bigram type might be identified and/or annotated as a text feature.

Similarly, a named entity feature can also be recognized using parts-of-speech identifiers. In such a case, a named entity can be identified as such when a span or token is associated with a particular sequence of part-of-speech identifiers (e.g., sequence of proper noun (NNP)) or a particular POS identifier. For instance, in a case where two or more consecutive words comprise a sequence of NNPs, a named entity can be identified and annotated as such. Stated differently, in this example, a named entity feature is recognized when a bigram type is identified as NNP_NNP. Accordingly, a name feature can indicate a name of a human or any other entity comprising a sequence of NNPs (i.e., a span of proper nouns). Named entities are generally associated with a category, such as, for example, names of persons, organizations, locations, expressions of times, quantities, monetary values, percentages, etc. Accordingly, in accordance with identifying that a token or span is a named entity, the category to which the entity belongs can also be recognized. As such, a named entity feature can include the token or span, an indication that the token or span is a named entity, an indication of the category to which the token or span belongs, and/or the like. For example, assume that a span "Susan Wright" or "Susan/NNP, Wright/NNP" is recognized. In such a case, a pattern of consecutive NNPs is identified as representing a named entity falling within a "names of persons" category identified as PNAME. As such, the named entity feature can include the span "Susan Wright" and the named entity category (i.e., [Susan_Wright, PNAME]). In some cases, named entity features can be identified based on POS annotations within a keyword-sentence window or list of tokens. In other cases, name features can be identified by referencing a pre-computed list of names.

Parts-of-speech identifiers can also be used to recognize a breakpoint feature. A breakpoint feature, as used herein, refers to an indication of a point at which a keyword-sentence window, or a sentence therein, can be appropriately truncated. In this regard, truncating a sentence at a breakpoint tends to conform with natural language breaks and avoids disrupting readability or comprehension of the snippet. To identify breakpoints, patterns of part-of-speech identifiers can be recognized. Accordingly, a breakpoint feature can be associated with one or more POS patterns. If such POS patterns are recognized within a keyword-sentence window, or a portion thereof (e.g., a bigram), a breakpoint feature is identified as such. For example, a comma followed by a conjunction (e.g., "and," "or," or "but") might be recognized as a POS pattern. POS patterns can be established using any manner, and such patterns are not required to only include part-of-speech identifiers. As can be appreciated, a breakpoint feature can include the text associated with the breakpoint, the part-of-speech pattern, a breakpoint indicator (e.g., BP), and/or a combination thereof. For instance, assume that ", and" is identified in a keyword-sentence window. In such a case, a breakpoint indicator (BP) might be used to designate that such a span is associated with a breakpoint feature (e.g., [, _and, BP]).

Other text features, such as an address, a phone number, and a predefined name, can be identified independent from part-of-speech identifiers. A predefined name refers to a predetermined list of tokens and/or sequence of tokens (i.e., span) previously recognized as an entity unacceptable to break. Predefined names can be generated based on a statistical word sequence model that indicates a particular sequence of words should not be broken. In the case of a predefined name being a token, a break or snippet boundary following the token is undesirable. In the case of a predefined name being a span, a break or snippet boundary occurring between tokens of the span is undesirable. For example, "New York" is an example of a predefined name that is deemed unacceptable to break between the two words of the span.

An address refers to any portion of an address (i.e., a token or span) designating a location. By way of example, and not limitation, city, state, region, country, and/or zipcode, etc. can be recognized as unacceptable to break. A phone number refers to a phone number presented in any format (e.g., 123.456.7890 or 123-456-7890). In the case of a feature being a token, a break or snippet boundary following the token might be undesirable. In the case of a feature being a span, a break or snippet boundary occurring between tokens of the span is undesirable.

As with other text features, a predefined name feature, an address feature, and/or a phone number feature can include the token or span and/or an indication that the token or span is a particular type of feature or span (e.g., a predefined name, an address, or a phone number). For example, an address span might be "San Francisco, CA" and identified as an address feature (e.g., [San_Francisco_,_CA, ADDRESS]). As can be appreciated, other text features within a keyword-sentence window can be identified and utilized, such as html formatting data (e.g., line breaks, bulleted lists, headings, etc.).

The break-feature identifying component 334 is configured to identify break features. A break feature, as used herein, refers to a feature that indicates an extent to which a break or snippet boundary is acceptable in association with a token and/or span. That is, a break feature indicates favorability of snippet boundaries. In embodiments, break features are identified utilizing text features, as more fully discussed below. Break features may include, for example, a breaking indicator and a span indicator. A breaking indicator, as used herein, refers to an indication of favorability of breaking a sentence after a token, before a token, or between two tokens. That is, a breaking indicator indicates whether it is favorable or unfavorable, or an extent to which it is favorable or unfavorable, to break a keyword-sentence window at a particular position (e.g., following a particular token). In some cases, a scale or rating system can be used. For example, a breaking indicator might be a numerical value between −10 and +10. In such a case, a negative number might indicate a favorable point to break, and a positive number might represent an unfavorable position at which to break.

In embodiments, each token of a keyword-sentence window is associated with a breaking indicator. In this regard, the breaking indicator indicates favorability of breaking the keyword-sentence window following the token. Alternatively, a breaking indicator can be determined for a portion of the tokens of a keyword-sentence window, such as, tokens associated with text features, etc. The break feature identifying component 334 uses the text features of the keyword-sentence window to determine or identify breaking indicators for tokens of the keyword-sentence window. For instance, particular bigram types, identification of named entities or categories thereof, addresses, phone numbers, and predefined names might be used to indicate that it is unfavorable to break following a token or between tokens of a span associated with such features. On the other hand, other bigram types and breakpoints might be used to indicate that it is favorable or acceptable to break the keyword-sentence window following a token or between tokens of a span associated with such features.

A span indicator is used to indicate whether a span is interesting or droppable. An interesting span indicator provides an indication that a span is interesting or pertinent to the keyword-sentence window or query in association therewith. Spans identified as being interesting can be used for various purposes, such as maintaining such spans within a snippet, influencing effectiveness of a particular snippet, etc. A span indicator might indicate a span as interesting based on text features of the keyword-sentence window. For instance, particular bigram types, identification of named entities or categories thereof, addresses, phone numbers, and predefined names might be identified as interesting and thereby associated with an interesting span indicator (e.g., ["Susan Wright", INTERESTING_SPAN], ["San Francisco, CA", INTERESTING_SPAN].

A droppable span indicator provides an indication that a span is uninteresting or irrelevant to the keyword-sentence window or query associated therewith. Spans identified as being droppable can be used for various purposes, such as dropping or removing such spans from a snippet, influencing effectiveness of a particular snippet, or the like. A span indicator might indicate a span as droppable based on text features or a type of text features of the keyword-sentence window. For example, particular bigrams types and/or text following a breakpoint might be identified as droppable and thereby associated with a droppable span indicator (e.g., ["(born 1948)", DROPPABLE_SPAN].

In some cases, each span within a keyword-sentence window is analyzed and, if appropriate, associated with a span indicator. In other cases, a portion of spans within a keyword-sentence window are assigned a span indicator. Such portions might be a randomly selected spans, spans for which a span indicator is identifiable, etc.

The snippet generator 314 is configured to generate snippets (e.g., such as partial snippets and optimal snippets). In this regard, when optimal snippets are displayed in association with a search results, a user can readily recognize information deemed valuable. In embodiments, the snippet generator 314 includes a partial-snippet generating component 340, a snippet feature determining component 342, a score calculating component 344, and a snippet selecting component 346.

The partial-snippet generating component 340 is configured to generate partial snippets from keyword-sentence windows. In this regard, the partial-snippet generating component 340 generates partial snippets having snippet boundaries that truncate the keyword-sentence window at various points. As can be appreciated, snippet boundaries might be positioned at the end of the partial snippet, the beginning of the partial snippet and/or in the middle or center of the partial snippet. A beginning snippet boundary refers to a boundary defining the beginning of the partial snippet. An ending snippet boundary refers to a boundary defining the end of the partial snippet. A center snippet boundary refers to a boundary defining at least a part of the middle of the partial snippet whereby a portion of text is omitted. In other words, a center snippet boundary coincides with an omission of words (e.g., identified by an ellipsis). The partial-snippet generating component 340 might reference and utilize tokens identified by the tokenizing component 342 to generate partial snippets.

As can be appreciated, partial snippets can be generated in any manner. In one embodiment, an initial partial snippet includes or comprises one or more keywords within a keyword-sentence window that match a query term. By way of example only, assume that a keyword-sentence window is "Susan Wright (born 1948) writes science fiction novels, and lives in San Francisco, Calif." In such a case, an initial partial snippet might include the keywords "Wright" and "Incontainables" that match query terms resulting in the partial snippet of "Wright . . . Incontainables." The beginning snippet boundary is prior to "Wright," the ending snippet boundary follows "Incontainables," a first center snippet boundary follows "Wright," and a second center snippet boundary proceeds "Incontainables." Although an initial partial snippet is discussed herein as including keywords that match query terms, any text of a keyword-sentence window can be included in an initial partial snippet.

Additional partial snippets can be generated by expanding the initial partial snippet. Partial snippets can be expanded methodically or in any manner. In some cases, an initial partial snippet is expanded by adding a token to the left and a token to the right of each token currently included within a partial snippet. For example, assume that a keyword-sentence window is "Susan Wright (born 1948) writes science fiction novels, and lives in San Francisco, Calif." Further assume that an initial partial snippet is "Wright . . . Incontainables." In such a case, a set of expanded partial snippets might be 1) Susan Wright . . . Incontainables, 2) Wright ( . . . Incontainables, 3) Wright . . . and Incontainables, 4) Wright . . . Incontainables., 5) Wright writes . . . Incontainables. As can be appreciated, such expansion can continue using the newly generated partial snippets (e.g., until nearly all or all of the tokens are included as a partial snippet) to generate additional sets of expanded partial snippets.

In some embodiments, spans identified as droppable (i.e., having a droppable span indicator) are removed or omitted from a partial snippet. In this regard, partial snippets do not include droppable spans. As can be appreciated, the partial-snippet generating component 340 can contemporaneously generate all partial snippets intended to be analyzed. Alternatively, a set of partial snippets might be generated (e.g., an initial partial snippet, a first set of expanded partial snippets, etc.) and analyzed. Thereafter, the previous partial snippets, or a portion thereof (e.g., a selected partial snippet) can be expanded to generate another set of partial snippets (e.g., derived from the previous set).

The snippet feature determining component 342 is configured to determine snippet features. A snippet feature refers to a feature of a partial snippet. Snippet features can be utilized to identify and/or select an optimal snippet preferring that potentially relevant information is not truncated from the keyword-sentence window. A snippet feature might be, for example, a span breakpoint measure, a span measure, a context measure, a merge measure. A span breakpoint measure refers to an indication of favorability of breaking a keyword-sentence window in accordance with the partial snippet. In this regard, a span breakpoint measure can indicate a numerical value associated with constructing a partial snippet in accordance with the snippet boundaries of the partial snippet. A span breakpoint value can be an aggregate or total of breaking indicators associated with the breaks of the partial snippet (e.g., breaking indicators identified by break-feature identifying component 334). By way of example only, assume that a partial snippet is "Susan Wright . . . Incontainables". Further assume that a breaking indicator after the token "Wright" is (−2), a breaking indicator before the token "Incontainables" is (3), a breaking indicator after "Incontainables" is (1), and a breaking indicator before "Susan" is (0). Accordingly, a span breaking indicator is the aggregate of such breaking indicators equal to (2).

A span measure refers to a measure or count of a particular type of span. In one embodiment, a span measure is a count of the number of spans within a partial snippet that are identified as interesting (i.e., an interesting span identified by break-feature identifying component 334). In another embodiment, a span measure is a count of the total number of spans within a partial snippet.

A context measure refers to a number of tokens surrounding a keyword within the partial snippet. For example, assume that the partial snippet is "Susan Wright . . . Incontainables" and that the keyword set includes keywords "Wright" and "Incontainables." In such a case, the context measure is equal to one in that one token "Susan" surrounds the keywords. A context measure can be used to recognize instances where many tokens surround one keyword, but minimal tokens surround another keyword.

A merge measure refers to a measure indicating whether the partial snippet has been aggregated or merged with another partial snippet. As can be appreciated any number of combination of snippet features can be identified and/or utilized to calculate a score for a partial snippet, as discussed more fully above. In some cases, a span breakpoint measure, a span measure, a context measure, and/or a merge measure can be directly used to calculate a score for a partial snippet. In other cases, such snippet features might be converted, normalized, etc., and, thereafter, utilized to calculate a score for a partial snippet.

The score calculating component 344 is configured to calculate snippet scores for partial snippets. A snippet score indicates the effectiveness or favorability of truncating a keyword-sentence window at snippet boundaries in accordance with a partial snippet. A snippet score can take on any form including a numerical value, a symbol, text, or the like. A snippet score can be calculated using any combination, calculation, algorithm, or aggregation of snippet features. The partial snippets and corresponding scores can be stored for example, in storage device 204 of FIG. 2.

The snippet selecting component 346 is configured to select snippets. In embodiments, the partial snippet with the highest or greatest score is selected. In one embodiment, a partial snippet can be selected from a set of partial snippets to be stored and/or returned to the partial-snippet generating component 340 for use in generating a set of expanded partial snippets derived from the selected partial snippet. By way of example, assume that a set of partial snippets includes 1) Susan Wright . . . Incontainables, 2) Wright ( . . . Incontainables, 3) Wright . . . and Incontainables, 4) Wright . . . Incontainables., 5) Wright writes . . . Incontainables. The partial snippet having the highest score (e.g., "Susan Wright . . . Incontainables [168]") can be selected, stored, and provided to the partial-snippet generating component 340 for generating additional snippets expanding from the selected snippet. Providing a single partial snippet to the partial-snippet generating component 340, as opposed to each partial snippet, can improve the efficiency of generating partial snippets as fewer variations of partial snippets are generated. Although discussed herein as returning a single partial snippet for expansion, any number of partial snippets can be provided for generating expanded snippets.

Alternatively or additionally, the snippet selecting component 346 can select partial snippets as an optimal snippet for display in association with search results. An optimal snippet can be selected from among all partial snippets or from among partial snippets selected from each set of snippets. By way of example, an optimal snippet and corresponding features might be "Susan Wright writes science fiction novels, . . . 'The Green Glass' and 'Incontainables." [BP_Alignment=85, NumHits=2, OptimalContent=90, Merge=0]."

In embodiments, the selected optimal snippet along with the corresponding features, such as snippet features, text features, and/or break features, are provided to a snippet ranker. The snippet ranking component receives references to one or more snippets, along with the features computed in the previous steps, and selects a final snippet for presentation. These snippets can be the results from the same or different keyword-sentence windows or can be supplied from storage. The snippet ranking component assigns overall scores to snippets depending on features. These features can consist of the scores from the snippet selecting component, as well as additional features that are dependent or independent on the keywords, their position in the document, the quality of the sections from which the keyword-sentence window was selected and others.

Figure 4A:
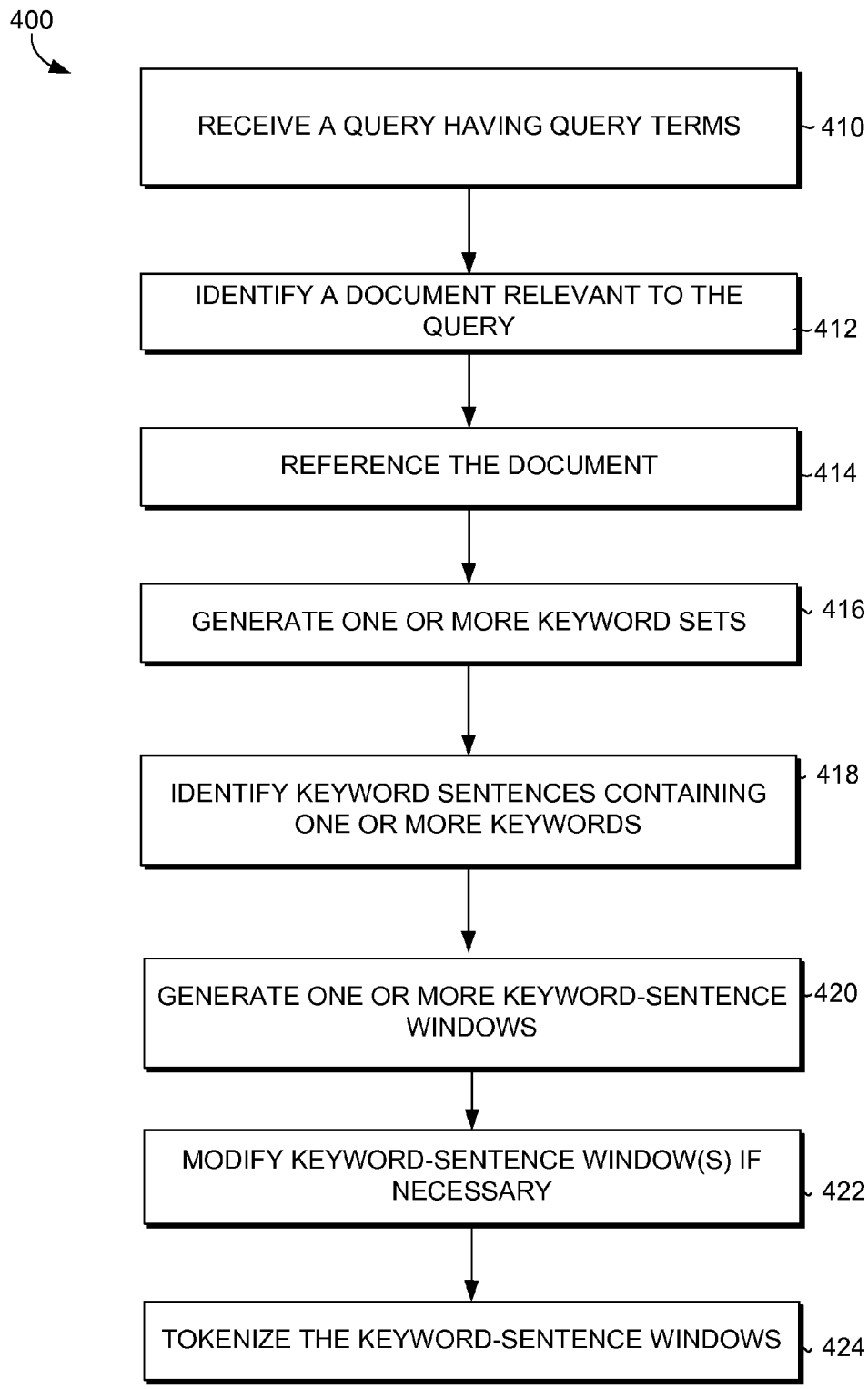
FIG. 4A is a flow diagram showing a method for facilitating generation of snippets, in accordance with an embodiment of the present invention.
Figure 4B:
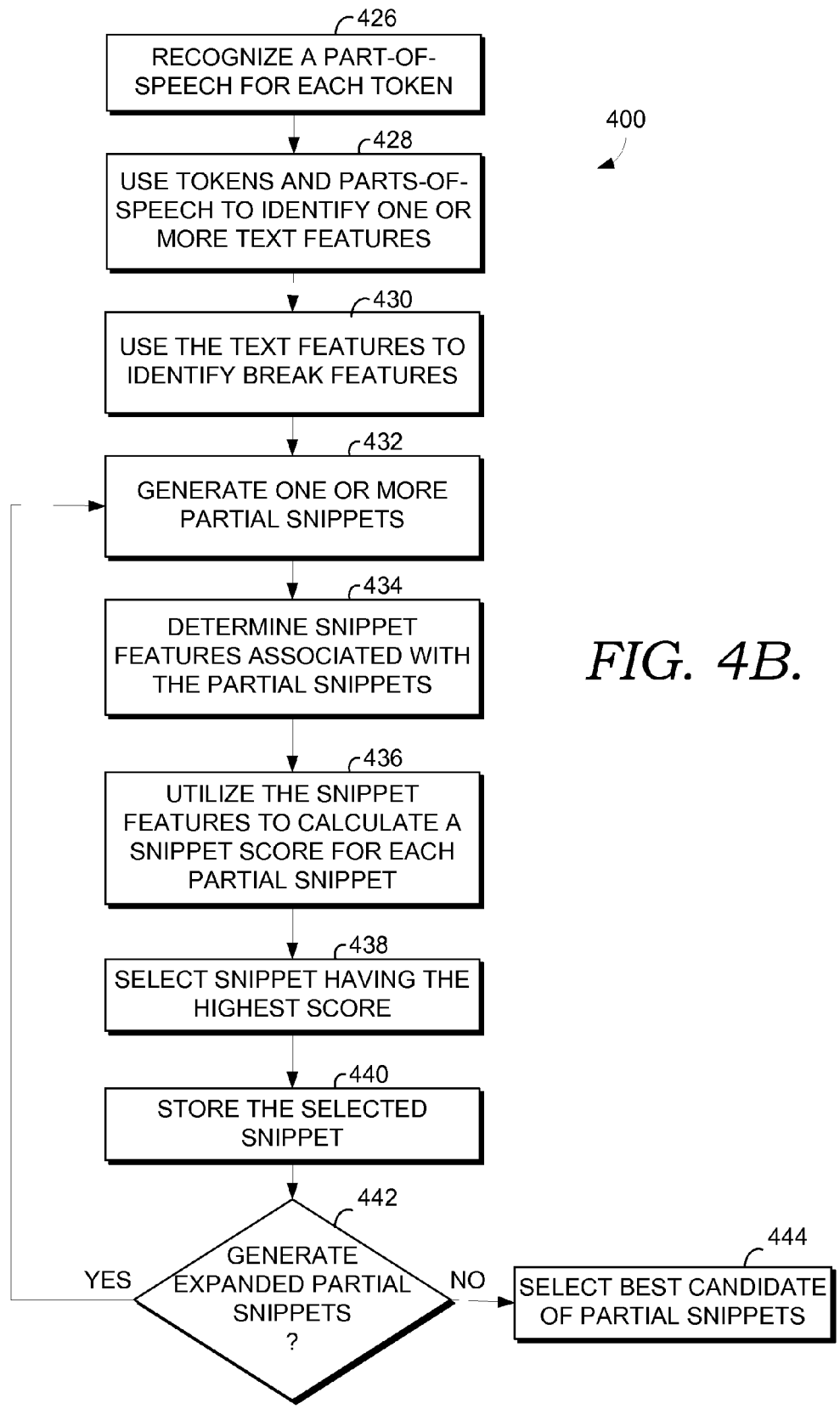
FIG. 4B is a continuation of the flow diagram of FIG. 4A showing a method for facilitating generation of snippets, in accordance with an embodiment of the present invention.

Turning now to FIGS. 4A and 4B, a flow diagram is illustrated which shows a method 400 for facilitating generation of snippets, in accordance with an embodiment of the present invention. Initially, at block 410, a query having one or more query terms is received. Such a query can be input by a user into a search website. At block 412, a relevant document (i.e., a webpage) having one or more keywords that match one or more query terms is identified. The document is referenced at block 414. At block 416, one or more keyword sets are generated. Such keyword sets include combinations of keywords. At block 418, keyword sentences containing one or more keywords are identified. In embodiments, a keyword sentence might be identified for each keyword within the keyword set. Subsequently, at block 420, one or more keyword-sentence windows are generated. Keyword-sentence windows include a keyword sentence having a keyword that matches a query term and, in some cases, can include other document sentences surrounding the keyword sentence. At block 422, keyword-sentence windows are modified, if necessary. In some cases, keyword-sentence windows are modified by aggregating or combining two or more windows due to overlapping of the windows or to the windows being adjacent to one another.

At block 424, keyword-sentence windows are tokenized to generate a set of tokens, such as words or punctuation. Subsequently, at block 426, a part-of-speech is recognized for each token. The tokens and corresponding parts-of-speech are analyzed and used to identify any text features including bigram types, named entities, breakpoints, predefined names, addresses, phone numbers, or the like. This is indicated at block 428. In some cases, additional processing might be required to identify such text features. For example, to recognize predefined names, the tokens might be compared to a list of predefined names, via a lookup index table or algorithm. At block 430, break features are identified using the text features. Accordingly, text features are used to generally identify locations at which it is favorable or unfavorable to truncate a keyword-sentence window. In embodiments, such break features include break indicators and/or span indicators.

At block 432, a set of one or more partial snippets of the keyword-sentence window are generated. Snippet features in association with each partial snippet are determined, as indicated at block 434. In embodiments, such snippet features may include a span breakpoint measure, a span measure, a context measure, a merge measure, or the like. At block 436, the snippet features are utilized to calculate a snippet score for each snippet. Subsequently, as indicated at block 438, a snippet corresponding with the highest or greatest snippet score from among the set of one or more partial snippets is selected. The selected snippet is stored at block 440. At block 442, it is determined whether expanded partial snippets should be generated. If it is determined that expanded partial snippets should be generated, the selected snippet is used to generate another set of one or more partial snippets that are expanded from the selected snippet, as indicated at block 432. For example, the selected snippet can be expanded by adding a token to the left and right of each token or span of the existing selected snippet. If, however, it is determined that expanded partial snippets are not desired, the best candidate of partial snippets is selected. This is indicated at block 444. Accordingly, at block 444, an optimal snippet is selected. Such an optimal snippet selection might be based on the scores calculated for each partial snippet.

It will be understood by those of ordinary skill in the art that the order of steps shown in the method 400 of FIGS. 4A and 4B are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer media devices having computer-executable instructions embodied thereon, that when executed, cause a computing device to perform a method for facilitating generation of snippets provided in association with search results, the method comprising:
    referencing a keyword-sentence window comprising a sequence of tokens including one or more keywords that match one or more query terms;
    identifying a part-of-speech for one or more tokens within the keyword-sentence window;
    utilizing the part-of-speech corresponding with each of the one or more tokens to identify one or more text features associated with a span including two consecutive tokens, wherein at least one text feature comprises a bigram type that is a sequence of two parts-of-speech identifiers that correspond with the span of the two consecutive tokens, the one or more text features being used to generate at least one breaking indicator for at least one token that indicates an extent to which it is favorable to break the keyword-sentence window following the corresponding token, wherein the extent to which it is favorable to break the keyword-sentence window following the corresponding token is represented using a scale or rating technique;
    generating a plurality of partial snippets comprising portions of the keyword-sentence window;
    for each partial snippet, identifying a snippet feature that indicates a relative strength of truncating the keyword-sentence window in accordance with the corresponding partial snippet, wherein the snippet feature comprises a sum of breaking indicators associated with the partial snippet that each indicate an extent to which it is favorable to break the partial snippet at the corresponding break; and
    using the snippet features to select a partial snippet from the plurality of partial snippets for display in association with a search result.

2. The media of claim 1 further comprising displaying the selected partial snippet in association with the search result.

3. The media of claim 1, wherein the selected partial snippet comprises text that breaks at natural beginning and ending points.

4. The media of claim 1, wherein the selected partial snippet characterizes a document in association with the search result such that desired information is not truncated from the keyword-sentence window.

5. The media of claim 1, wherein the one or more text features further comprise a named entity.

6. The media of claim 5, wherein the named entity is identified based on a pattern of part-of-speech identifiers.

7. The media of claim 1 further comprising identifying one or more additional text features based on tokens or spans within the keyword-sentence window.

8. The media of claim 1, wherein the one or more text features being further used to generate at least one span indicator for at least one span that indicates whether the span is interesting or droppable.

9. A method for facilitating generation of snippets provided in association with search results, the method comprising:
    identifying one or more text features for a plurality of spans within a keyword-sentence window, wherein at least one text feature comprises a named entity feature that is recognized when a span of two or more tokens has sequential parts-of-speech identifiers that match a predetermined sequence of part-of-speech identifiers;
    determining one or more breaking indicators associated with one or more of the plurality of spans using the one or more text features, each of the one or more breaking indicators providing an indication of an extent comprising a numerical value for which a snippet boundary is favorable relative to a particular position within the keyword-sentence window;
    generating a plurality of partial snippets comprising portions of the keyword-sentence window;
    for each partial snippet, identifying a snippet feature that indicates a relative strength of truncating the keyword-sentence window in accordance with the corresponding partial snippet, wherein the snippet feature comprises a sum of breaking indicators associated with the partial snippet that each indicate an extent to which it is favorable to break the partial snippet at the corresponding break; and
    using the snippet features to select a partial snippet from the plurality of partial snippets for display in association with a search result.

10. The method of claim 9, further comprising determining one or more span indicators to indicate whether one or more spans within the one or more of the plurality of spans is interesting or droppable.

11. The method of claim 9 further comprising displaying the selected partial snippet in association with the search result.

12. One or more computer media devices having computer-executable instructions embodied thereon, that when executed, cause a computing device to perform a method for facilitating generation of snippets provided in association with search results, the method comprising:
    identifying one or more text features associated with spans within a keyword-sentence window including at least one keyword that matches at least one query term, at least a portion of the one or more text features being identified based on a part-of-speech identifier associated with each of two or more consecutive tokens of the span;
    determining one or more break features associated with the spans using the one or more text features, the one or more break features providing an indication of whether a snippet boundary is favorable relative to a particular position within the keyword-sentence window;
    generating a plurality of partial snippets comprising portions of the keyword-sentence window;
    for each partial snippet, identifying a snippet feature that indicates a relative strength of truncating the keyword-sentence window in accordance with the partial snippet, wherein the snippet feature comprises a sum of breaking indicators associated with the partial snippet that each indicate an extent to which it is favorable to break the partial snippet at the corresponding break;

determining a score for each of the plurality of partial snippets that indicates favorability of truncating the keyword-sentence window at snippet boundaries as indicated in the partial snippet, the score being based on the one or more snippet features; and based on the scores, selecting a partial snippet from the plurality of partial snippets to display in association with a search result, the selected partial snippet designated as having optimal snippet boundaries.

13. The media of claim 12 further comprising displaying the selected partial snippet in association with a search result.

14. The media of claim 12, wherein generating the plurality of partial snippets comprises expanding one or more previous partial snippets.

* * * * *